United States Patent
Simonyi et al.

(10) Patent No.: US 9,747,196 B2
(45) Date of Patent: Aug. 29, 2017

(54) AUTOMATIC COMMISSIONING OF DIGITAL ADDRESSABLE LIGHTING CONTROL SYSTEMS

(71) Applicant: General Electric Company, Schenectady, NY (US)

(72) Inventors: Bulcsu Simonyi, Budapest (HU); Gabor Schmidt, Budapest (HU); Levente Kovacs, Budapest (HU)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 137 days.

(21) Appl. No.: 14/169,885

(22) Filed: Jan. 31, 2014

(65) Prior Publication Data
US 2015/0220428 A1 Aug. 6, 2015

(51) Int. Cl.
| | |
|---|---|
| H03K 17/00 | (2006.01) |
| G06F 12/02 | (2006.01) |
| H04Q 3/52 | (2006.01) |
| H04Q 3/54 | (2006.01) |
| H05B 37/02 | (2006.01) |

(52) U.S. Cl.
CPC .......... *G06F 12/0207* (2013.01); *H04Q 3/52* (2013.01); *H04Q 3/54* (2013.01); *H05B 37/0245* (2013.01)

(58) Field of Classification Search
CPC ........ G06F 12/0207; H04Q 3/52; H04Q 3/54; H05B 37/0245
See application file for complete search history.

(56) References Cited

U.S. PATENT DOCUMENTS

| | | |
|---|---|---|
| 8,373,362 B2 | 2/2013 | Chemel et al. |
| 8,422,401 B1 | 4/2013 | Choong et al. |
| 2004/0002792 A1 | 1/2004 | Hoffknecht |
| 2009/0066473 A1 | 3/2009 | Simons |
| 2010/0262297 A1* | 10/2010 | Shloush ............ H05B 37/0218 700/276 |
| 2011/0199004 A1* | 8/2011 | Henig ................ H05B 37/0218 315/152 |
| 2011/0199020 A1 | 8/2011 | Henig et al. |
| 2012/0032601 A1* | 2/2012 | Wendt .................... H05B 37/02 315/154 |
| 2013/0147366 A1 | 6/2013 | Huizenga et al. |

(Continued)

FOREIGN PATENT DOCUMENTS

| | | |
|---|---|---|
| WO | 2010122457 A2 | 10/2010 |
| WO | WO2013057646 | 4/2013 |
| WO | WO2013080082 | 6/2013 |

OTHER PUBLICATIONS

PCT Search Report and Written Opinion from corresponding PCT Application No. PCT/US2015/012576 dated May 4, 2015.

*Primary Examiner* — Omeed Alizada
(74) *Attorney, Agent, or Firm* — GE Global Patent Operation; Peter T. DiMauro

(57) ABSTRACT

A lighting system according to various embodiments includes a lighting array having a plurality of luminaires and a plurality of sensors. The lighting system also includes a controller configured to operate in at least one from the group including (i) pre commissioning mode and (ii) a commissioning mode. The pre-commissioning mode matches one of the luminaires with a corresponding one of the sensors to create luminaire-sensor pairs and the commissioning mode determines a location of each of the luminaire-sensor pairs.

20 Claims, 8 Drawing Sheets

(56) References Cited

U.S. PATENT DOCUMENTS

2013/0155392 A1 6/2013 Barrilleaux et al.
2014/0333206 A1* 11/2014 Simons .............. H05B 37/0218
     315/132

* cited by examiner

AUTOMATIC COMMISSIONING OF DIGITAL ADDRESSABLE LIGHTING CONTROL SYSTEMS

I. FIELD OF THE INVENTION

The present disclosure relates generally to the field of commissioning or activating lighting systems.

II. BACKGROUND OF THE INVENTION

Lighting designs have become increasingly complex due to the integration of daylighting, movable and fixed shading devices, occupancy sensors, addressable fixtures, and control sequences. Thus, it is becoming increasingly popular to create lighting networks.

Networked lighting systems typically comprise a set of luminaires, lighting sensors, and motion sensors, interconnected by a communication medium. The communication medium may be based on wires, radio frequency (RF) technology, or visible light communications (also known as coded light).

The interconnection between the luminaires, lighting sensors, and motion sensors enables a controlled lighting system, in which the information sensed by the sensors may be used to control the luminaires and, in particular, determine the intensity settings of these luminaires. Typically, one sensor controls one or more luminaires.

Some functionalities offered by these networked lighting systems are, for example, presence control and daylight adaptation. For presence control, luminaires, based on data sensed by motion sensors, are only switched on when at least one person is present. For daylight adaptation, luminaires, based on data sensed by light sensors, are dimmed when daylight enters the room (e.g. through the windows of the room).

The luminaires may be incorporated into the control system of the network by a commissioning process. Commissioning is the process of setting up the network by associating switches and sensors with one or more luminaires so that the luminaires can be operated individually or in groups by specific switches and sensors, with the overall network being managed by a controller.

To operatively couple the components to the control system in the commissioning process, every luminaire, switch and sensor must be assigned a unique network address for identification in order to receive, read and execute the command signals.

Commissioning also involves mapping the location of the physical components on a building plan with their unique network addresses. This is one of the key challenges of the commissioning process.

During some commissioning processes, certain components may be connected and grouped together in order to create functional groups. Luminaires assigned to a particular group are instructed to operate collectively in response to conditions, initiate particular lighting sequences and/or run particular programs.

Known commissioning techniques may be performed manually, semi-automatically or automatically. During a manual installation, a trained engineer or electrician installs the devices, then manually records the network address of each fixture on the building plan, and connects all the devices. The manual process may require the use of a ladder to access or touch the luminaire, especially for those luminaire located within a ceiling. The luminaires may be commissioned by the technician manually entering the addresses assigned to the devices into a database and defining the control functions to be implemented.

One example of a known semi-automated commissioning technique uses a test signal to cycle the power level of each light such that the luminaires flash in a random order. Then, the technician walks around searching the building attempting to locate the flashing luminaire and match it to the building plan. This process is repeated until all luminaires are identified and matched. It's especially tedious and difficult when the luminaires are located in multiple rooms or in a large building. In such situations, one technician cannot visually detect every luminaire. Thus, the commissioning of a large building or multiple rooms becomes a complex task involving numerous trained technicians. Unfortunately, data input mistakes frequently occur, which may lead to many errors during the commissioning of a large building with many floors.

Accordingly, such known techniques for commissioning luminaires can be relatively labor intensive, complex, time-consuming, expensive, and error prone.

As the number of luminaires in a building increase, the complexity of the commissioning process also increases. Thus, in more sophisticated systems, attempts have been made to automate the commissioning process by using signal sources and sensors associated with each luminaire to automatically create the functional groupings.

III. SUMMARY OF EMBODIMENTS OF THE INVENTION

In view of the aforementioned deficiencies, a need exists for a system and method that eliminates the need for a technician to locate every luminaire flashing in a random order. It also may be desirable to provide a commissioning technique that is relatively efficient and simple in terms of design and implementation. For example, it is desirable to provide a technique that can be reliably performed by minimally trained personnel with minimal human intervention.

Under certain circumstances, an embodiment of the present invention includes lighting system including a lighting array having a plurality of luminaires and a plurality of sensors. The lighting system also includes a controller configured to operate in at least one from the group including (i) pre commissioning mode and (ii) a commissioning mode. The pre-commissioning mode matches one of the luminaires with a corresponding one of the sensors to create luminaire-sensor pairs and the commissioning mode determines a location of each of the luminaire-sensor pairs.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

IV. BRIEF DESCRIPTION OF THE DRAWINGS

Figure 1:
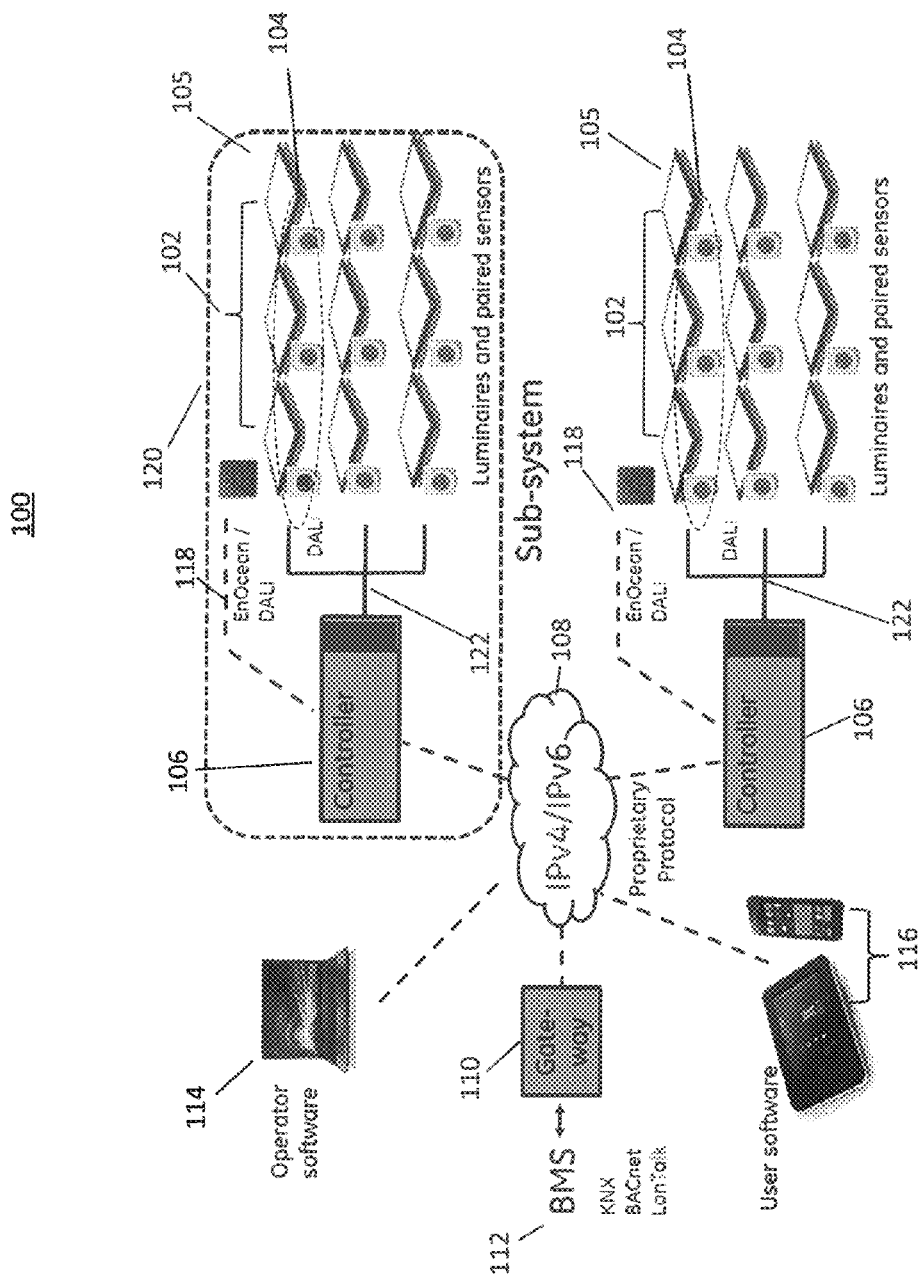
FIG. 1 illustrates an exemplary system for commissioning a lighting system in accordance with the present teachings.

The present disclosure may take form in various components and arrangements of components, and in various process operations and arrangements of process operations. The present disclosure is illustrated in the accompanying drawings, throughout which, like reference numerals may indicate corresponding or similar parts in the various figures. The drawings are only for purposes of illustrating preferred embodiments and are not to be construed as limiting the disclosure. Given the following enabling description of the drawings, the novel aspects of the present disclosure should become evident to a person of ordinary skill in the art.

V. DETAILED DESCRIPTION OF VARIOUS EMBODIMENTS

The following detailed description is merely exemplary in nature and is not intended to limit the applications and uses disclosed herein. Further, there is no intention to be bound by any theory presented in the preceding background or summary or the following detailed description.

Throughout the application, description of various embodiments may use "comprising" language, however, it will be understood by one of skill in the art, that in some specific instances, an embodiment can alternatively be described using the language "consisting essentially of" or "consisting of".

For purposes of better understanding the present teachings and in no way limit the scope of the teachings, it will be clear to one of skill in the art that the use of the singular includes the plural unless specifically stated otherwise. Therefore, the terms "a," "an" and "at least one" are used interchangeably in this application.

Unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained. In some instances, "about" can be understood to mean a given value ±5%. Therefore, for example, about 100 nm, could mean 95-105 nm. At the very least, each numerical parameter should at least be construed in light of the number of reported significant digits and by applying ordinary rounding techniques.

Various embodiments provide a system and method that relates to an indoor lighting control system, which includes real-time controlling and monitoring of multiple luminaires installed indoors. The control system may operate as a function of detecting ambient illumination levels and also user presence, movement and interference in various buildings.

The system identifies every end-points (e.g. luminaires, sensors, switches) by a unique addresses. Initially, after the installation of these components, the physical locations of certain end-points are unknown. The system and method pair the end-point addresses with actual locations. This process is called commissioning.

According to the present teaching, the controller is the basic building block of the system. Through a lighting interface, the controller operates the connected luminaires in accordance with techniques running thereon and based on the inputs provided by the sensors, switches and smart devices. In various embodiments, the controllers communicate with each other and the smart devices through a communications network.

In the embodiments, each fixture in the system includes an integrated multi-sensor accessible through a different address than the luminaire. The operator software, which runs on a smart device or a personal computer (PC), is capable of configuration and high-level operation of the entire system. The smallest building block of the system which is capable of functioning on its own is the sub-system. The sub-system may be configured to consist of one controller and adherent luminaires, sensors and switches. The user software, which runs on a smart device, is capable of adjusting illumination settings of a sub-system, or part of a sub-system. It also may be granted limited access to other sub-systems.

FIG. 1 illustrates an exemplary commissioning system 100 for commissioning a lighting system 105. An exemplary embodiment of the commissioning system 100 may include luminaires 102, sensors 104, switches 118, one or more controllers 106, a building management system (BMS) gateway 110 (optional), a digital addressable lighting interface (DALI) bus/ZigBee Network, a backbone network, user software 116, and operator software 114.

In FIG. 1, the lighting system 105 may also include control devices (such as dimmers and switches) and power drivers to set the output light level of each luminaire as a function of sensor outputs and control device settings.

In various embodiments, the lighting fixtures of the luminaires may comprise mounting hardware and one or more light-emitting elements such as incandescent or fluorescent bulbs or arrays of light-emitting diodes (LEDs). For example, the luminaire may be a lamp in an indoor fixture operated by a lighting interface compatible driver or ballast. In most cases, a passive infrared (PIR) ambient-light sensor 104 may be installed within the fixture of the luminaire 102. These sensors typically detect motion by detecting the infrared radiation emitted from an object. In use, the lamp remains on as long as a person's presence is detected in a room. The lamp automatically switches off within a predetermined amount of time after the room is vacated.

The PIR sensor 104 may communicate with the system 100 by a DALI bus 122. The DALI bus 122 is a lighting interface that provides a bus connection among the luminaires, sensors, switches and the controller as defined by the DALI protocol International Electrotechnical Commission (IEC) 60929/IEC 62386 standard. DALI is a commonly used technical standard for lighting control in buildings and houses, which is based on a network bus. All of the end point devices may be connected to the DALI bus, wherein they can be addressed with physical addresses.

The lighting interface of the DALI protocol can be a common digital interface that connects the controller to the end points. The end point devices may include, for example, luminaires, sensors or switches connected to system 100. The switches (not shown in FIG. 1) can be, for example, a wall mounted multi-switch, which is connected to the DALI bus 122 or EnOcean technology 118. EnOcean 118 is a wireless energy harvesting communication protocol ratified as the international wireless standard ISO/IEC 14543-3-10.

In lieu of the DALI standard, those having skills in the art would understand that other wired standards, such as DMX, may be employed with the commissioning system 100 of the present teachings.

In addition to the wired interface provided by the DALI bus 122, in various embodiments, the commands can also be carried through a wireless interface, such as the ZigBee wireless communication protocol. The ZigBee network is a lighting interface that provides a wireless network connection among the luminaires, sensors, switches and controllers as defined by the ZigBee protocol IEEE standard 802.15.4. The ZigBee protocol is commonly employed in building control systems as it allows simple communication between components that require little data processing. However, integration with the BMS 112 is desirable. Such integration can be achieved through gateway 110 components or through controllers equipped with radio interfaces such as ZigBee in addition to other wireless interfaces and protocols.

In FIG. 1, controller 106 communicates with each of the luminaires 102 and sensors 104 over a network 108. The communication between the luminaires 102 and other devices are configured such that all input devices, such as dimmers and sensors, send data to controller 106 which then controls the luminaires 102 connected to the DALI bus 122. In some embodiments, controllers 106 may allow the lights connected to the DALI bus 122, to be controlled by other communication standards (such as EnOcean 118) or via smart devices, such as PCs, smartphones, tablets or the like.

Controller 106 controls the luminaires by transmitting data, such as commands, signals and status information, containing information to identify the luminaire or groups of luminaires. The controller 106 knows the identifying information corresponding to the targeted luminaire. Thus, a commissioning process is implemented to (1) associate individual luminaires with their respective switches and sensors and (2) associate individual luminaires with a particular location within a building plan. The pre-commissioning and commissioning processes in accordance with the present teachings will be described further below.

In various embodiments, controller 106 may be configured as an embedded device in connection with the DALI bus 122 and switches (not shown in FIG. 1) and in connection through the network 108 with other controllers and smart devices.

In various embodiments, some components of the system 100 may be coupled to a form a sub-system 120. Sub-system 120 can be configured as the smallest building block of the system, which is capable of functioning independently. For example, as shown in FIG. 1, sub-system 120 can be configured to consist of one controller 106 and adherent luminaires 102, sensors 104 and switches (not shown in FIG. 1). The software running on controller 106 may be used to operate the sub-system 120.

Operator software 114, which may be a program running on a smart device or a personal computer, is configurable such that it performs high-level operations throughout the entire commissioning system 100.

User software 116, which may be a program running on a smart device, may be configured to adjust illumination settings of a sub-system or a portion of a sub-system.

In FIG. 1, network 108 allows for communication between the various components of system 100. Network 108 facilitates the transport of information between any two or more devices coupled to the network. Network 108 may be a local, proprietary network (e.g., intranet) and/or may be a part of a larger wide-area network.

For example, the network 108 may be a local area network (LAN), which may also be communicatively coupled to a wide area network (WAN) such as the Internet. In some embodiments, network 108 may be configured to transmit various electromagnetic waves, including, for example, radio signals. Examples of the network 108 may include IEEE 802.11 (Wi-Fi or Wireless LAN) networks, IEEE 802.16 (WiMAX) networks, IEEE 802.16c networks, and the like.

In various embodiments, network 108 may be a backbone network, which connects each controller 106 to smart devices 116, gateways 110 and other controllers in the system. Backbone network 108 may be configured to use the Ethernet as a physical network interface, UDP/IP protocol for the transport layer, and the NILCS protocol for the application layer. The NILCS protocol is a system specific application layer protocol, which interconnects all the components of the system 100.

In general, the lighting system 105 is controlled through network 108, wherein a data stream containing data packets of information is communicated to the luminaires 102. The data packets are structured and used in accordance with an Internet-layer type protocol for packet-switched internetworking.

For example, the data packets may be packaged and communicated in accordance with Internet Protocol version 6 (IPv6) or in accordance with Internet Protocol version 4 (IPv4). As understood by one of skill in the art, many other suitable protocols, such as transmission control protocol (TCP), Internet Protocol (IP), or propriety protocols can be used and are within the spirit and scope of the present invention. Additionally, gateway 110 provides secure connection between system 100 and an external BMS 112 using protocols such as KNX, BACnet or LonTalk protocols.

In various embodiments, BMS 112 may communicate with the installed luminaires through a wired interface such as DALI or through a wireless interface such as a dedicated RF communication interface in residential or commercial buildings. The BMS 120 may send commands using one of the possible communication interfaces such that luminaires in the lighting system 105 can be programmed, controlled, and information or status can be retrieved for energy control and conservation, emergency functions, for safety and security, for convenience and any other functionality desired by a user.

BMS 120 may be controlled to implement the desired functionality via any method mentioned herein. By way of an example, the BMS 120 with an RF communication interface may communicate through network 108 that allows it to communicate with any luminaire in the system. Software executing on the BMS 120 may allow a user, via a graphical user interface, to open a web browser and use the IP address assigned to a particular luminaire.

The BMS 120 may control the lighting installation to turn lights on, off, set the light intensity level, control which luminaires are activated, retrieve any information from the luminaire or control any sensor in the lighting system 105. Unique or group IDs or network addresses may be assigned to multiple sensors or switches, individual sensors or switches, or individual luminaires such that a user can control the lighting installation of one luminaire, distinct groups of luminaires or the entire set of luminaires.

Components of the system 100 may be configured such that they are capable of autonomous operation. Communication through the network 108 may be needed only during system calibration and at high level actions, minimizing the amount and frequency of communicated data. For example, the system needs to send occasionally ON, OFF, or dimming-level message. Interchangeable controllers with the same hardware and software may be connected to the backbone network, decentralizing the system and making it robust and scalable in a wide range of applications.

Figure 2A:
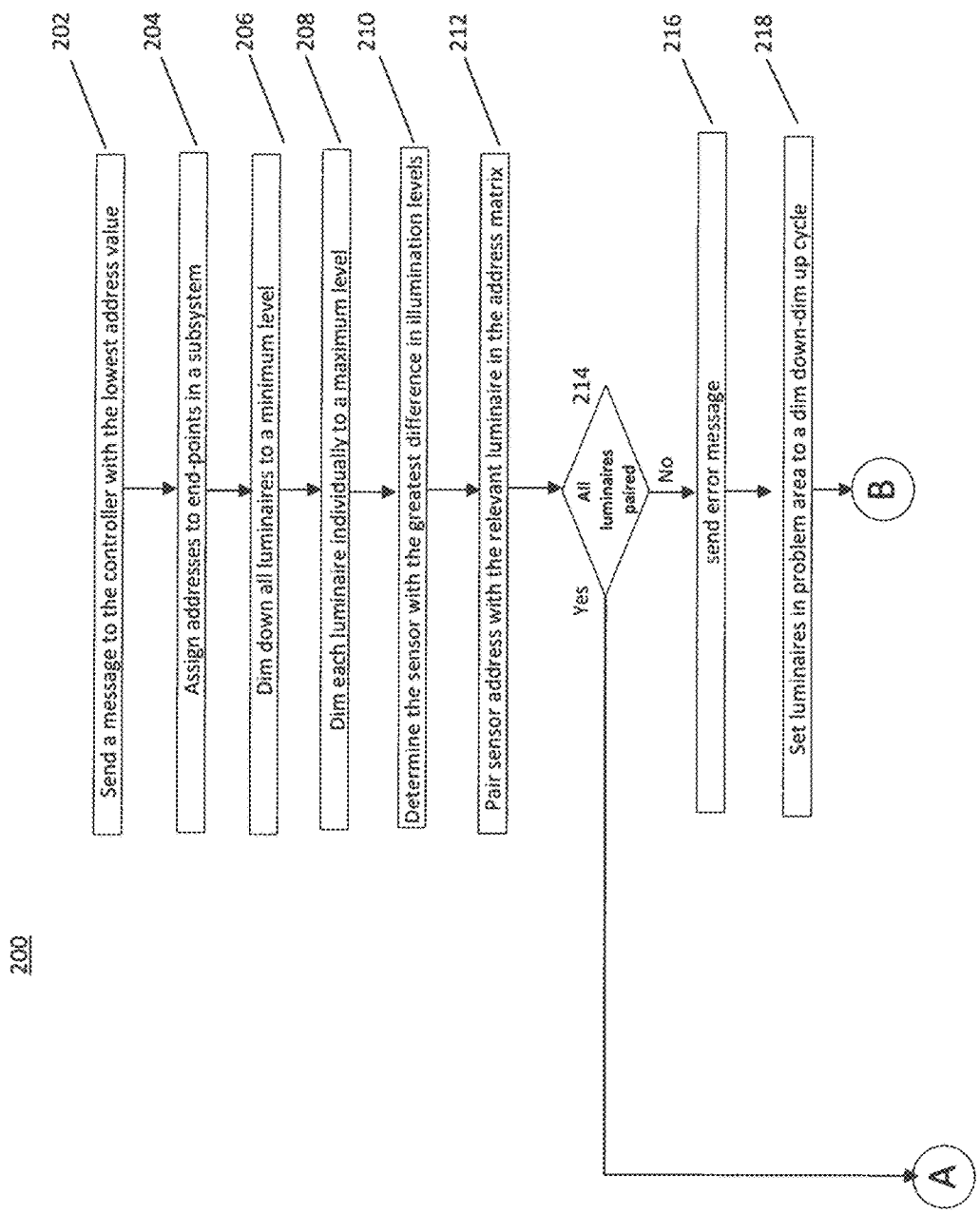
FIG. 2A is a flowchart of an exemplary method of pre-commissioning a lighting system in accordance with the present teachings.
Figure 2B:
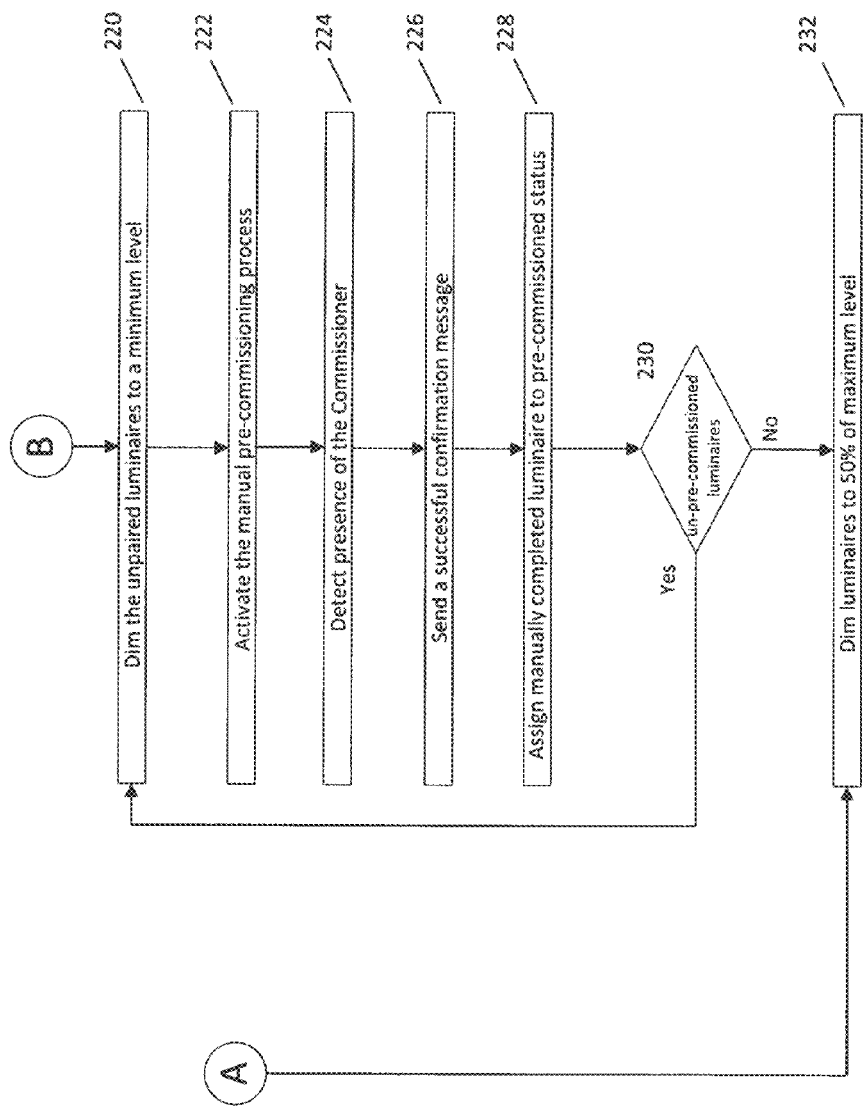
FIG. 2B is a continuation of the method illustrated in FIG. 2A.

FIGS. 2A/2B illustrate an exemplary method for pre-commissioning the lighting system 105. In a bus system, as illustrated in FIG. 1, the luminaires 105 and sensors 104 are installed as separate components, wherein they made be housed together or positioned adjacent to each other. Thus, both the drivers of the luminaires 102 and the sensors 104 have their own addresses. Initially, it is not known within the system 100 which sensor is paired physically with a particular luminaire. The pre-commissioning process 200 is executed in order to map these relations. The pre-commissioning process pairs the sensor and luminaire based on their physical location.

In step 202, the pre-commissioning process begins when the software 114 sending a message to the controller 106 with the lowest address value. In step 204, the controller with the lowest address value assigns all the addresses of the end-points in sub-system 120 using the method described in the lighting interface standard (e.g. DALI). After the completion of step 204, in step 206, the controller 106 dims down all the luminaires 102 to the minimum level.

In step 208, the controller 106 starts to dim the luminaires 102 up individually, one by one, to the maximum level. In step 210, the controller 106 determines that the sensor 104 which senses the greatest difference in illumination levels during each dimming cycle is the sensor 104 housed inside the luminaire currently dimmed to maximum level and its address is instantly paired to the address of the relevant luminaire in the controller's address matrix in step 212.

The pre-commissioning is an iterative process such that after completing step 212, the controller 106 performs a verification in step 214 to test whether every luminaire is paired up with a sensor. If the pre-commissioning was unsuccessful, the first step (step 202) is repeated. If the issue remains after the completion of a predetermined number of attempts (i.e., performing the first step for the second time), in step 216, an error message is sent to the operator software 114 to alert the operator and the commissioner.

By way of example, the commissioner can be the person conducting the commissioning process within the designed area of a building. Then, in step 218, all the luminaires 102 in the sub-system 120 are set to a dim down-dim up cycle between 50 and 100% light level so the area within the building where the issue is present can be located. In step 220, the luminaires 102, which do not have sensors 104 paired to them, are dimmed to minimum level.

Once the commissioner locates the luminaire 102 dimmed to the minimum level, in step 222, the commissioner may then activate the "manual pre-commissioning" process by selecting, for example, an icon on the screen of the commissioning/user software 116. The user software 116 may run on a smart device. The smart devices may contain an output interface for presenting information to a user, and an input interface for receiving user selections, for example, through a touch screen, voice activation, mouse click, keyboard, keypad, a data entry mechanical switch or button, or other day entry devices.

To implement the manual pre-commissioning in step 222, the commissioner needs to be standing directly under the luminaire until the sensor detects the commissioner's presence in step 224. When the manual pairing is successful, a confirmation message appears on the screen in step 226. Then, in step 228, the luminaire joins the dim down-dim up cycle of the other already-pre-commissioned luminaires. In step 230, any remaining un-pre-commissioned luminaire is dimmed to a minimum level. If the luminaire in step 228 was the last un-paired luminaire in the sub-system, all the luminaires are dimmed to 50% of the maximum level in step 232.

When all luminaires are paired with a sensor in every sub-system, a pre-commissioning completion notice is sent to the operator software 114 and the user software 116. For example, a "Pre-commissioning is completed" message may appear on both the commissioner's and the operator software's screen. Thus, all the luminaires are set to a 50% light level.

Figure 3A:
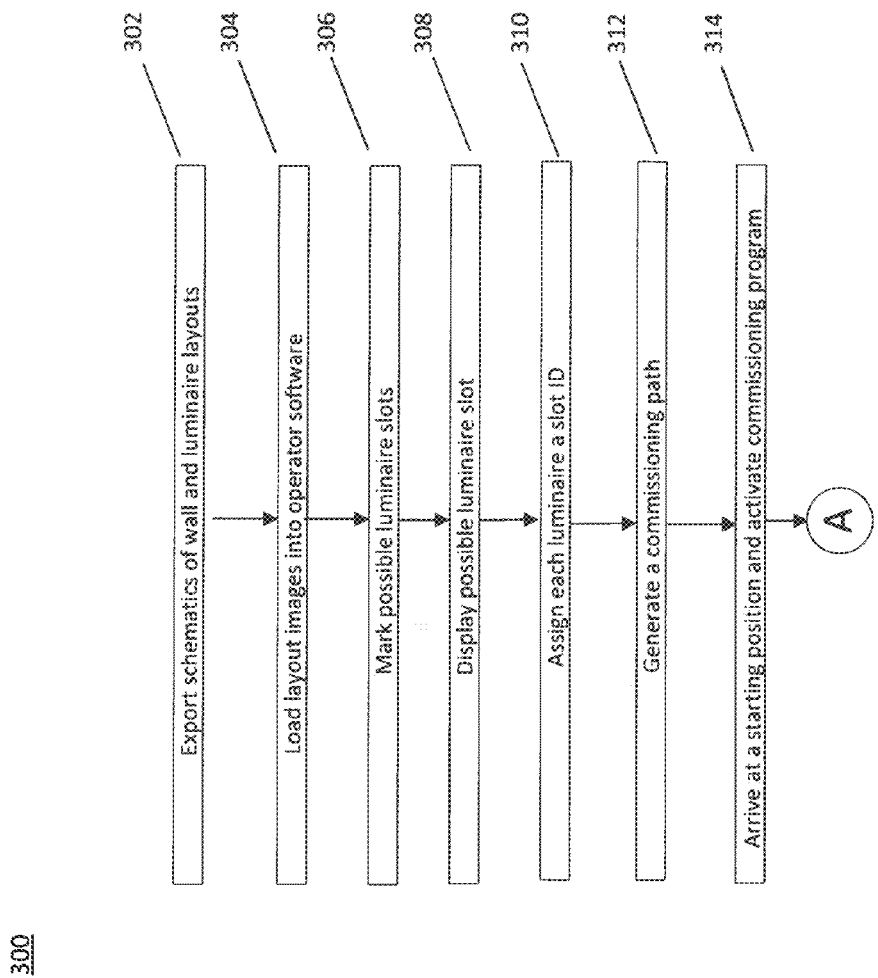
FIG. 3A is a flowchart of an exemplary method of commissioning a lighting system in accordance with the present teachings.

FIGS. 3A/3B and 4 illustrate an exemplary method for executing a semi-automatic commissioning process 300 where the commissioner locates the physical location of the luminaire-sensor pairs simply by passing under the luminaires or directing torchlight towards the luminaires. The luminaire-sensor pairs may have been previously mapped according to the pre-commission process described above or according to another process.

Figure 4:
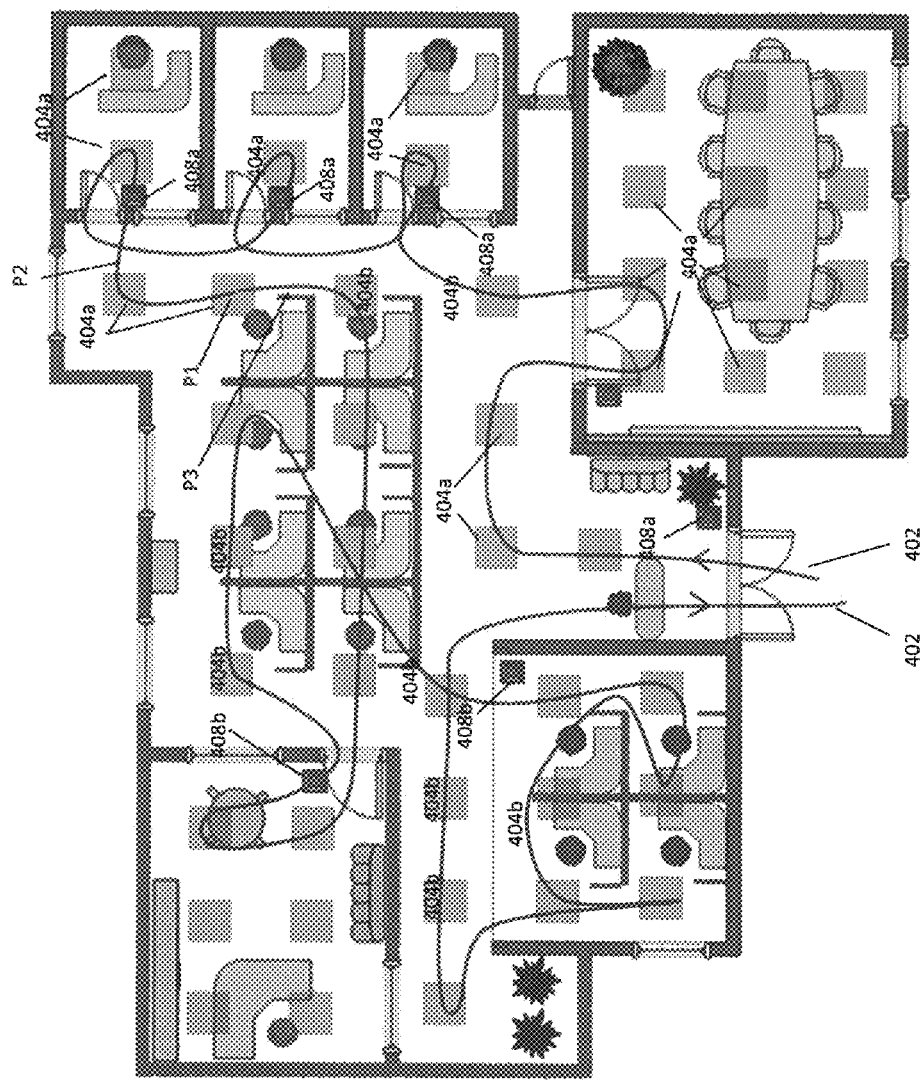
FIG. 4 is a schematic illustration of a building plan depicting rooms that include luminaires to be commissioned utilizing the commissioning system in accordance with the present teachings.

The advantages of the commissioning process 300 in comparison to traditional commissioning techniques are numerous. For example, the commissioner locates the luminaires merely by walking along a predefined path 402, as depicted in FIG. 4. Therefore, the commissioner is not required to search for the location of every luminaire flashing in a random order throughout the entire building. Another advantage is that, even when luminaires located in a single room need to be commissioned, it is more efficient and faster just to walk under each of the luminaires than assigning them to a group or a physical location manually. A further advantage is that the commissioning process 300 also consists of some steps where no human intervention is required.

Acquiring the schematics 400 (as shown in FIG. 4) of certain floors or building where the lighting system 105 is installed is a prerequisite of the commissioning process. In step 302, the wall and the luminaire layouts are exported from a CAD software into two separate image files. In step 304, these image files are loaded these into the operator software 114 and used then by the system, in step 306, to mark the possible slots for luminaires within the building. In step 308, these possible slot locations are displayed on a display screen. In step 310, the operator software 114 assigns each luminaire location a slot ID.

In step 312, the operator software generates a commissioning path 402 which the commissioner follows during the commissioning process. The commissioning path may be plotted to traverse a designated area. The designated area may be, for example, an entire building, a section of a building, an entire room and a section of a room. For example, the commissioning path 402 may be plotted such that it begins at a first location (e.g., at a first door as an entry point of the floor/building) and ends at a different location (e.g., at a second door as an exit point).

However, if only one door is available, the operator software may plot the commissioning path 402 such that the entrance to and exit from the room is located at the same door, as shown in FIG. 4. The commissioning path 402 leads the commissioner directly under the luminaires 404a, 404b. In one embodiment, the commissioning path may involve every luminaire and switch in every room or designated area.

In alternative embodiment, which will be described below with regards to FIGS. 5 and 6, the commissioning path may include at least two luminaires located within a room or designated area. The operator software calculates the commissioning path 402 such that it is optimized so the commissioner travels the smallest distance possible without frequent turns.

The commissioning process 300 may be carried out by one person/equipped, who walks along the commissioning path while the person is equipped, for example, with a portable smart device (preferably, a tablet having a large screen) with the user software 116 executing thereon. The commissioning mode of the user software 116 can be enabled using the operator software 114 once the operator software grants the user software rights to access and use the commissioning program. In addition to granting the rights to the user software, the operator software also transmits to the user software the building schematics, the pre-filled address matrix of luminaire slots, and the predefined commissioning path using extra-protocol data transfer.

The commissioner should be generally familiar with the arrangement of the building. In step 314, the commissioner arrives at the starting position defined by the commissioning path 402 and activates the "Start Commissioning" button on the smart device's screen.

Initially as the commissioner enters the room or designated area, all the luminaires are set to a minimum light level, excluding the luminaires 404a, 404b identified on the commissioning path 402. The luminaires 404a, 404b identified on the commissioning path 402 are set to a 50% light level. In step 316, all slot IDs on the screen of the commissioner software are labeled and displayed as "un-commissioned".

In step 318, when the commissioner walks under a luminaire and the commissioner's presence is detected, for example, by an occupancy sensor, the attached controller of the smart device searches the pre-filled address matrix, in step 320, and instantly sends the system address of that sensor and the conjugated luminaire to which it is joined together as a pair in step 322. In embodiments where the commissioner uses a torchlight to perform the commissioning process, at this stage of the process, the operator software monitors all incoming sensory data regarding movements or rapid light level changes to identify the conjugated luminaire.

In step 324, an order of slot IDs derived from the commissioning path 402 is stored in the operator software 114. The operator system 114 assigns every new address-pair received to correspond to the next unassigned slot ID on the commissioning path and is instantly matched to the luminaire on the schematic. Then in step 326, the operator system sends a confirmation message to the commissioner/user software. In step 328, the located luminaires are set to a 100% light level, and they appear on the screen of the commissioning software as "successfully commissioned." In addition, on the screen, the software may change the appearance of the section of the path which is under the commissioned luminaires to indicate the luminaire's change of status from un-commissioned to commissioned.

For example, in FIG. 4, the already commissioned luminaires 404a may be changed to display a distinctive marking representing their current status, which distinguishes them from the un-commissioned luminaires 404b. By way of example, on the screen of the smart device, the color of the already commissioned luminaires 404a may be changed from gray (un-commissioned) to yellow (commissioned).

Similarly, the commissioning path may also be dynamically change to indicate the commissioner's current location and to distinguish between the already commissioned section of the path and the un-commissioned section of the path.

In FIG. 4, the current location of the commissioner is noted as P1, the already commissioned section of the path is noted as P2, and the un-commissioned section of the path is noted as P3. The notations and indicia described herein are exemplary and non-limiting. Those skilled in the art would recognize that a variety of notations and indicia may be used to indicate a change in the components status from un-commissioned to commissioned and indicate the current position of the commissioner.

As there are overlaps in the sensing ranges of the occupancy sensors, there are numerous occasions where more than one sensor may simultaneously detect the commissioner's presence. Thus, the operator software must define the commissioning path 402 such that commissioner approaches from a direction to encounter the sensory range of the occupancy sensor of one luminaire, with the largest time lapse possible, before encountering another lamination. This enables the system to distinguish between the two luminaires with the greatest confidence.

Paths, such as the path 402, can be generated by the operator software 114, controllable via a smart device executing the user software 116. The paths are generated in a way that results in the smallest number of luminaires which the commissioner passes under more than once. As the commissioner passes under a particular luminaire a second time, the correspondingly the location, of this signal (i.e., the sensor) is already known since the sensor was previously commissioned. Therefore, the system can immediately begin to listen to (i.e., sense) the next sensor's signal input and can continue with the allocation process.

In addition, the system operator software 114 may indicate the switches, which also need to be commissioned, next to the path commissioning 402 displayed on the screen of the smart device. In FIG. 4, the switches are indicated by the square shapes. In FIG. 4, the already commissioned switches are labeled 408a, and the un-commissioned switches are labeled 408b.

As the commissioner reaches the relevant sections of the building, the commissioner has to press or activate the indicated switches. If the switch has multiple buttons, the commissioner has to press them all, so that the system will recognize the number of buttons on the switch. After the switches are pressed or activated, the attached controller sends the switches' address to the operator software. The switches' addresses are distinguishable from the luminaires' or sensors' addresses. This eliminates the possibility of the system incorrectly identifying the slot ID-address of a detected sensor and a pressed switch, when both are transmitted to the operator software at the same time.

Alternatively or additionally, if commissioning by walking under the luminaires in certain section of the room or the entire room is not possible, the commissioner can choose on the user software the commission by light option. In such embodiments, the ambient light sensors are active, rather than the occupancy sensors. The commissioner follows the commissioning path 402 by directing a beam of light into the luminaires' sensors according to the order defined by the commissioning path.

The commissioner can also un-commission certain luminaires. These luminaires are returned to an un-commissioned state and their slot IDs are separated from their addresses.

Figure 5:
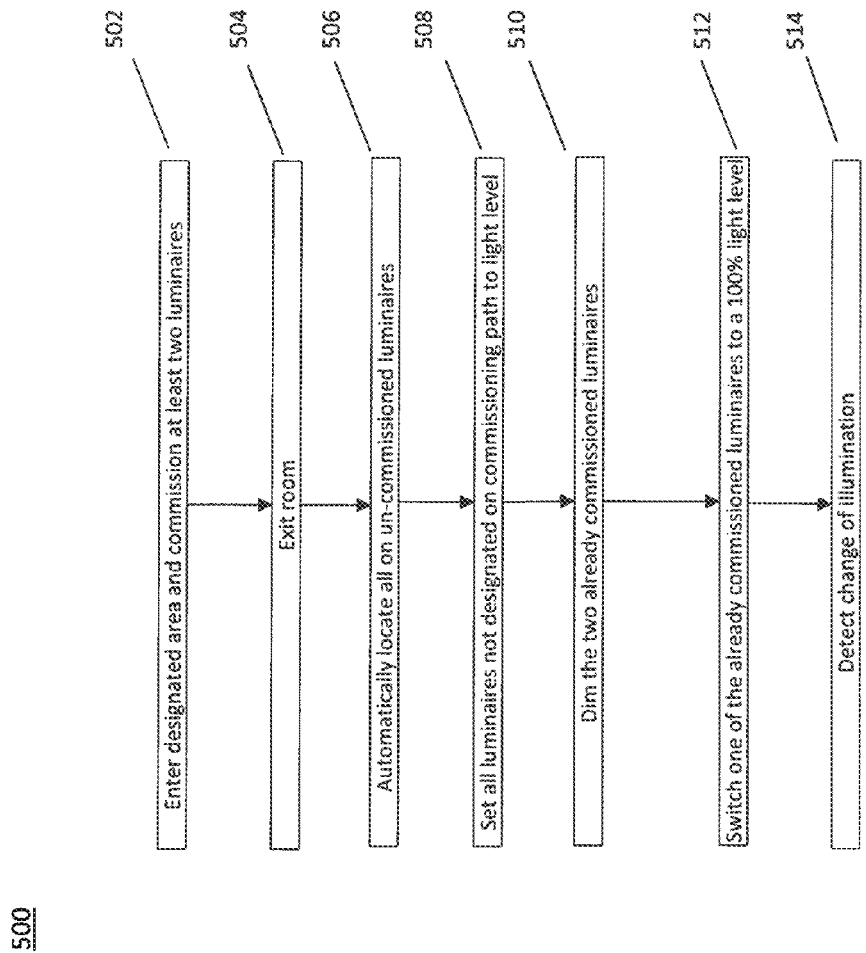
FIG. 5 is a flowchart of another exemplary method of commissioning a lighting system in accordance with the present teachings.

FIG. 5 illustrates another exemplary method for executing an automatic commissioning process 500 where the commissioner locates the luminaires pairs simply by passing under only two luminaires before exiting a room.

Initially in the process 500, the addresses of all the other luminaires in the room are unknown, and an automated process is needed to complete the commissioning process. In step 502, the commissioner enters the room and commissions at least two luminaires. Alternatively in process 500, upon entering the room or designated area, the commissioner may commission more than two luminaires but less than all luminaires in the room or designated area. In step 504, the commissioner exits the room.

After the commissioner exits the room, (preferably closing the door, if possible), in step 506, the system starts automatically locating all uncommissioned luminaires in the room. The door is preferably closed to reduce the chances of unsuccessful commissioning due to the introduction of artificial or natural light.

In step 508, every sensor which is not defined in the commissioning pathway is set to light level detection only. Then, in step 510, the two already commissioned luminaires are also dimmed down to a minimum light level as all luminaires designated on the commissioning path, so that there is almost complete darkness in the room.

In step 512, one of the already commissioned luminaires switches to a 100% light level. In step 514, the sensors of the uncommissioned luminaires detect the change of illumination. The degree of the change of illumination is proportional to the distance of the un-commissioned luminaires from the flashing 100% illuminated already commissioned luminaire. Based on the room schematic and slot layout, the system is able to determine how many neighboring luminaires are positioned nearby the already commissioned luminaires. The method of detecting each luminaire in the room is further explained through an example presented in FIG. 6.

Figure 6:
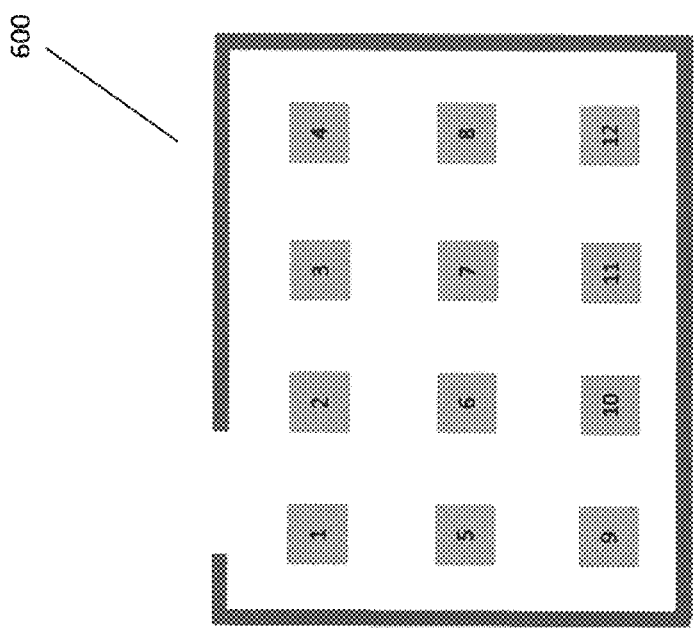
FIG. 6 depicts a room that includes luminaires to be commissioned utilizing a commissioning system in accordance with the present teachings.

FIG. 6 provides an illustration of a plurality of luminaires located within a room 600, which are commissioned according to the automatic commissioning process 500 described in FIG. 5. The process uses a single sensor to determinate the location of adjacent or nearby luminaire-sensor pairs. In FIG. 6, the first already commissioned luminaire is indicated by number 1, and the second already commissioned luminaire is indicated by number 2.

When the first already commissioned luminaire 1 flashes to a 100% illumination level, the largest change in the illumination is measured by the luminaire in slot 5, with a certain likelihood, as it is closest to luminaire 1. The second largest change of illumination is measured by luminaire 6. When luminaire 2 flashes, the largest differences in illumination levels are measured at luminaire slots 3 and 6 and the second largest differences are measured at luminaire slots 5 and 7. The system automatically assigns the sensors with corresponding data to the respective slot IDs.

When a particular luminaire's position is identified for the first time, the system assigns the luminaire a probability rating (PR) of 50%. This is set as a gauge for determining if the assumed position assignment is successful or not. If during the ensuing flashing cycles, the sensor in a luminaire measures light level such that it changes positively corresponding to its assumed position. Then, the probability rating is increased to a value of $(1-PR)*0.5+PR$. If there is no correspondence, the rating is decreased to a value of $(1-PR)*0.75+PR$. When the probability rating of a luminaire reaches 90%, it is considered commissioned by the system. As understood by one of skill in the art, different coefficients can be used in the foregoing expressions, and would be within the spirit and scope of the present invention.

If the probability rating of certain luminaires in an area does not reached the desired level within a predetermined amount of time, the luminaires with the highest rating—neighboring that area—may start flashing to determine the relative position of the other luminaires.

Figure 3B:
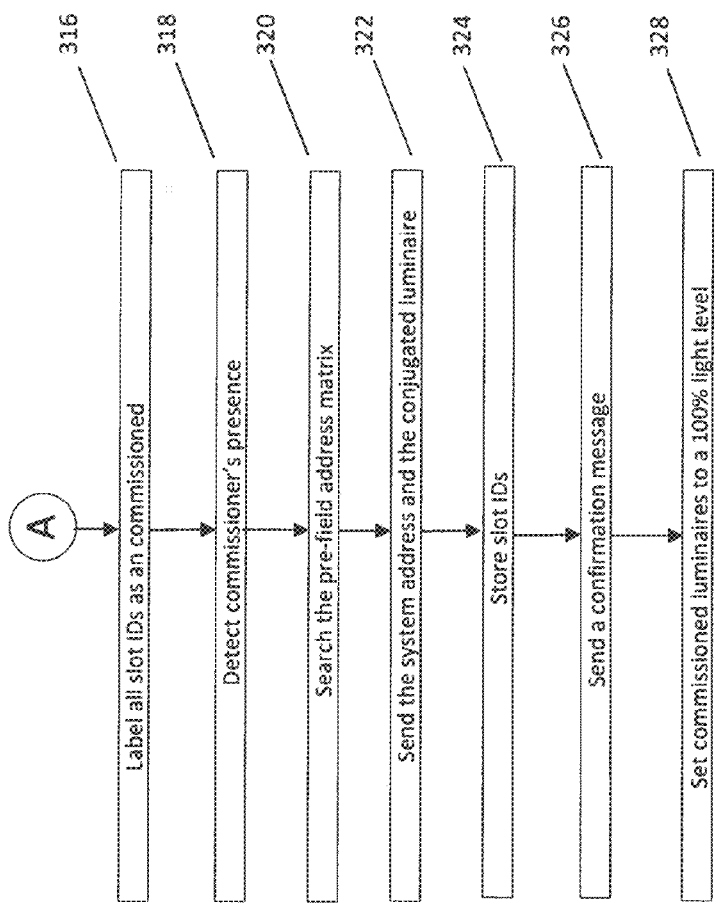
FIG. 3B is a continuation of the method illustrated in FIG. 3A.

After a luminaire's probability rating has decreased a predetermined number of times (e.g., five times), the commissioning of that room is considered partly commissioned. The luminaires with at least 90% probability rating are set by the system to commissioned status and any others luminaires are set to un-commissioned status. The system then sends an error message to the commissioner and the operator to notify the commissioner to return to that room to manually correct the problem. The commissioner has to walk the commissioning path to complete the commissioning process according to the methods described in FIGS. 3 and 4.

Note that this automatic commissioning strategy 500 is most successfully implemented if all the luminaires are properly installed and no other artificial or natural sources of light is present within the room. No objects that may disturb light propagation or reflection are allowed to be present in the area during commissioning process 500.

After all the luminaires are commissioned, the operator software sends out the slot ID-system address pairs to the respective controllers. Each controller only receives data regarding the pairs with the addresses of the end-points within their sub-system Then the operator software disables the commissioning mode, and the user software, which conducted the commissioning, is returned to normal mode.

The list of terms provided below defines various nomenclature applicable to and incorporated within the exemplary embodiments described herein:

The detailed descriptions may have been presented in terms of a software application executed on a computer or network of computers. These procedural descriptions and representations are the means used by those skilled in the art to most effectively convey the substance of their work to others skilled in the art. The embodiments of the invention may be implemented as apparent to those skilled in the art in hardware or software, or any combination thereof. The actual software code or hardware used to implement the present invention is not limiting of the present invention. Thus, the operation and behavior of the embodiments often will be described without specific reference to the actual software code or hardware components. The absence of such specific references is feasible because it is clearly understood that artisans of ordinary skill would be able to design software and hardware to implement the embodiments of the present invention based on the description herein with only a reasonable effort and without undue experimentation.

A procedure is described herein, and generally, conceived to be a sequence of operations leading to a desired result. These operations comprise physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, objects, attributes or the like. It should be noted, however, that all of these and similar terms are to be associated with the appropriate physical quantities and are merely convenient labels applied to these quantities.

Further, the manipulations performed are often referred to in terms, such as adding, comparing, or calculating, which are commonly associated with mental operations performed by a human operator. No such capability of a human operator is necessary, or desirable in most cases, in any of the operations of the present invention described herein; the operations are machine operations. Useful machines for performing the operations of the present invention include general purpose digital computers, special purpose computer or similar devices.

Each operation of the method may be executed on any general computer that includes a processor, such as a mainframe computer, smart device, or the like and pursuant to one or more, or a part of one or more, program modules or objects generated from any programming language, such as C++, Java, FORTRAN, etc. And still further, each operation, or a file, module, object or the like implementing each operation, may be executed by special purpose hardware or a circuit module designed for that purpose.

For example, the invention may be implemented as a firmware program loaded into non-volatile storage or a software program loaded from or into a data storage medium as machine-readable code, such code being instructions executable by an array of logic elements such as a microprocessor or other digital signal processing unit. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on.

In the case of diagrams depicted herein, they are provided by way of example. There may be variations to these diagrams or the operations (or operations) described herein without departing from the spirit of the invention. For instance, in certain cases, the operations may be performed in differing order, or operations may be added, deleted or modified.

An embodiment of the invention may be implemented as an article of manufacture comprising a computer usable medium having computer readable program code means therein for executing the method operations of the invention, a program storage device readable by a machine, tangibly embodying a program of instructions executable by a machine to perform the method operations of the invention, or a computer program product.

Such an article of manufacture, program storage device or computer program product may include, but is not limited to, CD-ROM, CD-R, CD-RW, diskettes, tapes, hard drives, computer system memory (e.g. RAM or ROM), and/or the electronic, magnetic, optical, biological or other similar embodiment of the program (including, but not limited to, a carrier wave modulated, or otherwise manipulated, to convey instructions that can be read, demodulated/decoded and executed by a computer). Indeed, the article of manufacture, program storage device or computer program product may include any solid or fluid transmission medium, whether magnetic, biological, optical, or the like, for storing or transmitting signals readable by a machine for controlling the operation of a general or special purpose computer according to the method of the invention and/or to structure its components in accordance with a system of the invention.

An embodiment of the invention may also be implemented in a system. A system may comprise a computer that includes a processor and a memory device and optionally, a storage device, an output device such as a video display and/or an input device such as a keyboard or computer mouse. Moreover, a system may comprise an interconnected network of computers. Computers may equally be in stand-alone form (such as the traditional desktop personal computer) or integrated into another apparatus (such as a cellular telephone).

The system may be specially constructed for the required purposes to perform, for example, the method of the invention or it may comprise one or more general purpose computers as selectively activated or reconfigured by a computer program in accordance with the teachings herein stored in the computer(s). The system could also be implemented in whole or in part as a hard-wired circuit or as a circuit configuration fabricated into an application-specific integrated circuit. The invention presented herein is not inherently related to a particular computer system or other apparatus. The required structure for a variety of these systems will appear from the description given.

Those skilled in the art will also appreciate that various adaptations and modifications of the preferred and alternative embodiments described above can be configured without departing from the scope and spirit of the disclosure. Therefore, it is to be understood that, within the scope of the appended claims, the disclosure may be practiced other than as specifically described herein.

We claim:

1. A lighting system comprising:
   a lighting array including: a plurality of luminaires; a corresponding plurality of sensors; and
   a controller configured to operate in at least one from the group including (i) pre commissioning mode and (ii) a commissioning mode;
   wherein the pre-commissioning mode matches one of the luminaires with a corresponding one of the sensors based on a location of one of the luminaires and the corresponding sensor, the pre-commissioning creating luminaire-sensor pairs;
   wherein the commissioning mode includes a pre-determined commissioning path comprising a layout of luminaire locations; and
   wherein the controller, via the commissioning mode, (i) receives data when one of the plurality of sensors detects light, (ii) searches a list of stored addresses corresponding to the plurality of sensors, and (iii) identifies the luminaire-sensor pair locations along the commissioning path.

2. The system according to claim 1, wherein the the predetermined path includes a user following under luminaires to be commissioned.

3. The system according to claim 2, wherein data is received as the user moves along the predetermined path and the sensors detect occupancy under the luminaires and in response determines the location of the luminaire-sensor pair by searching a list of addresses stored in the controller.

4. The system according to claim 3, wherein the data comprises current status data, wherein the current status data indicates current status information regarding at least one luminaire-sensor pair indicating a commissioned status or un-commissioned status, indicating sections of the a predetermined path as a commissioned status or an un-commissioned status, and indicating a current position of the user identified along the predetermined path.

5. The system according to claim 4, wherein the predetermined path is based upon calculations; and wherein the calculations are optimized to define a path that encounters an occupancy sensor having a the largest time lapse possible when there are overlapping sensor ranges transmitted from one of the plurality of sensors.

6. The system according to claim 5, wherein the calculations are optimized to determine a path having a shortest distance.

7. The system according to claim 5, wherein the calculations are optimized to include the least amount of turns possible within the predetermined path.

8. The system according to claim 1, wherein the controller, luminaires and sensors are configured to communicate through a network.

9. The system according to claim 1, wherein the matching includes pairing an address of each luminaire to an address of one sensor based on illumination level comparisons.

10. The system according to claim 9, wherein the enabling is based on data received corresponding to a computer-generated schematic of the a designated area; a schematic identifying possible locations for each luminaire-sensor pair, an address matrix listing an address of each luminaire-sensor pairs, and a computer generated path, which traverses the designated area.

11. A method for commissioning a lighting system including a lighting array having a plurality of luminaires and a corresponding plurality of sensors, the lighting array disposed in a designated area to be illuminated, the method comprising:
performing via a controller at least one from the group including (i) a pre-commissioning phase and (ii) a commissioning phase;
wherein the pre-commissioning phase includes matching one of the luminaires with a corresponding one of the sensors based on a location of one of the luminaires and the corresponding sensor, the pre-commissioning creating luminaire-sensor pairs within the lighting array;
wherein the commissioning phase includes a pre-determined commissioning path comprising a layout of luminaire locations; and
wherein the controller, via the commissioning phase, (i) receives data when one of the plurality of sensors detects light, (ii) searches a list of stored addresses corresponding to the plurality of sensors, and (iii) identifies the luminaire-sensor pair locations along the commissioning path.

12. The method according to claim 11, further comprising defining a predetermined path that follows under to be commissioned;
wherein the matching includes pairing an address of each luminaire to an address of each single sensor based on illumination level comparisons; and
wherein the enabling is based on data received corresponding to a computer-generated schematic of the designated area which identifies possible location identifications for each luminaire-sensor pair, an address matrix listing an address of each luminaire-sensor pairs, and a computer generated path, which traverses the designated area.

13. The method according to claim 12, further comprising:
receiving data as the controller moves along the predetermined path, detecting occupancy under the luminaires, and in response, determining the location of the luminaire-sensor pair by searching a list of addresses stored in the controller.

14. The method according to claim 12, wherein the data includes current status data, the current status data indicating current status information regarding at least one luminaire-sensor pair indicating a commissioned status or un-commissioned status, indicating sections of the computer-generated path as a commissioned status or an un-commissioned status, and indicating a current position of the controller identified along the pre-determined path.

15. The method according to claim 14, wherein the predetermined path includes calculations; and wherein the calculations are optimized to define a path that encounters an occupancy sensor having the a largest time lapse possible when there are overlapping sensor ranges transmitted from a plurality of occupancy sensors.

16. The method according to claim 15, wherein calculations of the computer generated path are optimized to determine a path having a shortest distance.

17. The method according to claim 16, wherein calculations of the predetermined path are optimized to include the least amount of turns possible within the computer generated path.

18. The method according to claim 11, wherein the controller, luminaires and sensors are configured to communicate through a network.

19. An electronic system comprising:
an array of switches; corresponding plurality of sensors; and
a controller configured to operate in at least one from the group including (i) pre commissioning mode and (ii) a commissioning mode;
wherein the pre-commissioning mode matches one of the switches with a corresponding one of the sensors based on a location of one of the arrays and the corresponding sensor, the pre-commissioning creating switch-sensor pairs;
wherein the commissioning mode includes a pre-determined commissioning path; and
wherein the controller, via the commissioning mode, (i) receives data when one of the plurality of sensors detects light (ii) searches a list of stored addresses corresponding to the plurality of sensors and (iii) identifies the switch-sensor pair locations along the commissioning path.

20. A method for commissioning an electronic system including an array of switches and a corresponding plurality of sensors, the method comprising:
performing via a controller at least one from the group including (i) a pre-commissioning phase and (ii) a commissioning phase;
wherein the pre-commissioning phase includes matching one of the switches with a corresponding one of the sensors based on a location of one of the switches and the corresponding sensor, the pre-commissioning creating switch-sensor pairs within the lighting array;
wherein the commissioning phase includes a pre-determined commissioning path; and
wherein the controller, via the commissioning mode, (i) receives data when one of the plurality of sensors detects light, (ii) searches a list of stored addresses corresponding to the plurality of sensors, and (iii) identifies the switch-sensor pair locations along the commissioning path.

* * * * *